(12) United States Patent
Xing (10) Patent No.: US 11,506,183 B2
(45) Date of Patent: Nov. 22, 2022

(54) HEATING DEICING SYSTEM FOR BLADE AND CONTROL METHOD THEREOF, BLADE AND WIND TURBINE

(71) Applicant: XINJIANG GOLDWIND SCIENCE TECHNOLOGY CO., LTD., Xinjiang (CN)

(72) Inventor: Bo Xing, Beijing (CN)

(73) Assignee: XINJIANG GOLD WIND SCIENCE & TECHNOLOGY CO., LTD., Urumqi (CN)

( * ) Notice: Subject to any disclaimer, the term of this patent is extended or adjusted under 35 U.S.C. 154(b) by 183 days.

(21) Appl. No.: 16/652,014

(22) PCT Filed: Apr. 27, 2018

(86) PCT No.: PCT/CN2018/084900
§ 371 (c)(1),
(2) Date: Mar. 27, 2020

(87) PCT Pub. No.: WO2019/091055
PCT Pub. Date: May 16, 2019

(65) Prior Publication Data
US 2020/0263671 A1    Aug. 20, 2020

(30) Foreign Application Priority Data
Nov. 9, 2017 (CN) .......................... 201711096990.3

(51) Int. Cl.
*F03D 80/40*    (2016.01)
*F03D 1/06*    (2006.01)

(52) U.S. Cl.
CPC ........... *F03D 80/40* (2016.05); *F03D 1/0675* (2013.01); *F05B 2240/30* (2013.01); *F05B 2260/208* (2013.01); *F05B 2270/303* (2013.01)

(58) Field of Classification Search
CPC ........ F03D 80/40; F03D 80/60; F03D 1/0675; F05B 2240/30; F05B 2270/303; F05B 2260/208; Y02E 10/72
See application file for complete search history.

(56) References Cited

U.S. PATENT DOCUMENTS 2,320,870 A * 6/1943 Johnson ................. B64D 15/02
244/134 B
2,510,170 A * 6/1950 Chillson ................. B64D 15/02
244/134 B
(Continued)

FOREIGN PATENT DOCUMENTS

| CN | 102748243 A | 10/2012 |
| CN | 205330892 U | 6/2016 |

(Continued)

OTHER PUBLICATIONS

International Search Report in corresponding PCT Application No. PCT/CN2018/084900, dated Aug. 1, 2018, 11 pages.
(Continued)

*Primary Examiner* — David E Sosnowski
*Assistant Examiner* — Wayne A Lambert
(74) *Attorney, Agent, or Firm* — Bayes PLLC (57) ABSTRACT

A heating deicing system for a blade and a control method thereof, a blade and a wind turbine are provided according to the present disclosure. The heating deicing system for the blade includes an isolating device, which is arranged in a blade cavity and divides a part of the blade cavity close to a leading edge of the blade into multiple sub-cavities sequentially distributed along a length direction of the blade, and each of the sub-cavities is provided with a heating device. The heating deicing system for the blade includes a controller, which is configured to separately control opening and closing of each set of multiple sets of heating devices in (Continued)

each sub-cavity to heat the multiple sub-cavities in response to a blade deicing instruction.

20 Claims, 5 Drawing Sheets

(56) References Cited

U.S. PATENT DOCUMENTS

| | | | | |
|---|---|---|---|---|
| 2,556,736 A * | 6/1951 | Palmatier | ............... | B64D 15/02 244/134 B |
| 2,690,890 A * | 10/1954 | Weeks | ................. | F03D 1/0675 219/202 |
| 6,467,730 B2 * | 10/2002 | Laugt | .................... | B64D 15/04 244/57 |
| 6,890,152 B1 * | 5/2005 | Thisted | .................. | F03D 80/40 416/41 |
| 7,217,091 B2 * | 5/2007 | LeMieux | ................ | F01D 25/02 415/905 |
| 7,931,445 B2 * | 4/2011 | Haans | .................... | F03D 80/55 416/1 |
| 8,029,239 B2 * | 10/2011 | Luetze | ................... | F03D 15/05 416/93 R |
| 8,038,398 B2 * | 10/2011 | Nanukuttan | ............ | F03D 80/40 416/39 |
| 8,039,980 B2 * | 10/2011 | Mizoue | .................. | F03D 80/40 290/55 |
| 8,376,704 B2 * | 2/2013 | Haans | .................. | F03D 1/0675 416/91 |
| 9,090,343 B2 * | 7/2015 | Scott | .................... | B64C 27/473 |
| 9,169,830 B2 * | 10/2015 | Weitkamp | ............ | F03D 1/0675 |
| 9,518,561 B2 * | 12/2016 | De Boer | ................. | F03D 80/60 |
| 9,828,972 B2 * | 11/2017 | Cuoghi | ................... | F03D 17/00 |
| 10,041,477 B2 * | 8/2018 | Bahuguni | ............... | F03D 80/40 |
| 10,458,396 B2 * | 10/2019 | Philipsen | ............... | F03D 80/40 |
| 11,236,733 B2 * | 2/2022 | Scholte-Wassink | ........................ | F03D 1/0675 |
| 2004/0041408 A1 * | 3/2004 | Casazza | ............... | H02K 7/1838 290/55 |
| 2010/0119370 A1 * | 5/2010 | Myhr | ....................... | F03D 80/40 416/169 R |
| 2011/0038729 A1 | 2/2011 | Shymanski et al. | | |
| 2013/0101414 A1 | 4/2013 | Weitkamp et al. | | |
| 2014/0356187 A1 * | 12/2014 | Wong | ...................... | F03D 80/40 416/96 R |
| 2014/0363293 A1 * | 12/2014 | Kim | ...................... | G01B 11/06 356/326 |
| 2015/0056074 A1 | 2/2015 | Veldkamp et al. | | |
| 2016/0003223 A1 * | 1/2016 | Barth | .................... | F03D 1/0675 416/1 |
| 2017/0254316 A1 * | 9/2017 | Philipsen | ................ | F03D 80/40 |

FOREIGN PATENT DOCUMENTS

| | | | | |
|---|---|---|---|---|
| CN | 206111438 U | | 4/2017 | |
| CN | 206256999 U | | 6/2017 | |
| CN | 107110127 A | * | 8/2017 | ........... F03D 1/0675 |
| CN | 107905961 A | | 4/2018 | |
| CN | 105683566 B | * | 8/2018 | ........... F03D 1/0675 |
| DE | 102010051293 A1 | * | 5/2012 | ............ F03D 80/40 |
| GN | 103080537 A | | 5/2013 | |
| KR | 20130025560 A | | 3/2013 | |
| WO | WO-2014202164 A1 | * | 12/2014 | ........... F03D 1/0675 |
| WO | 2017108064 A1 | | 6/2017 | |

OTHER PUBLICATIONS

Extended European Search Report issued in corresponding European Application No. EP 18 87 5469, dated Nov. 23, 2020, 6 pages.
First Office action issued in corresponding Chinese Application No. 201711096990 3, dated Jan. 28, 2019, 18 pages.

* cited by examiner

HEATING DEICING SYSTEM FOR BLADE AND CONTROL METHOD THEREOF, BLADE AND WIND TURBINE

CROSS-REFERENCE TO RELATED APPLICATIONS

This application is a national phase of International Application No. PCT/CN2018/084900, titled "FAN BLADE HEATING AND DEICING SYSTEM AND CONTROL METHOD, FAN BLADE, AND WIND TURBINE," filed on Apr. 27, 2018, which claims the benefit of priority to Chinese Patent Application No. 201711096990.3, filed with the Chinese State Intellectual Property Office on Nov. 9, 2017, the entire disclosures of which are incorporated herein by reference.

FIELD

The present application relates to the technical field of wind power generation, in particular to a heating deicing system for a blade and a control method thereof, a blade and a wind turbine.

BACKGROUND

At present, wind turbines are mostly installed in remote areas with harsh environments. These remote areas have low temperature and high humidity in winter, which may easily cause the formation of ice on the surface of the blade. On one hand, ice formation on the blade surface increases the mass of the blade, thus the connecting parts of the blade are subjected to more loads, which decreases the service life of the blade connecting parts. On the other hand, ice formation on the blade surface affects the aerodynamic performance of the blade surface, which results in lower power generation of the wind turbine.

In a first aspect, a heating deicing system for a blade is provided according to an embodiment of the present application, and the heating deicing system includes:

an isolating device arranged in a blade cavity and dividing a part of the blade cavity close to a leading edge of the blade into a plurality of sub-cavities sequentially distributed along a length direction of the blade;

a heating device arranged in each of the sub-cavities; and a controller configured to separately control opening and closing of the heating device in each of the sub-cavities to heat the plurality of sub-cavities in response to a blade deicing instruction.

In a second aspect, a heating deicing control method for a blade applicable to the heating deicing system for the blade is provided according to an embodiment of the present application, and the heating deicing control method includes: prioritizing the plurality of sub-cavities; and in response to the blade deicing instruction, separately controlling opening and closing of the heating device in each of the sub-cavities in order of priority, to heat the plurality of sub-cavities.

In a third aspect, a blade is provided according to an embodiment of the present application, and the heating deicing system for the blade as described above is arranged in the blade.

In a fourth aspect, a wind turbine is provided according to an embodiment of the present application, which includes the blade.

In a fifth aspect, a computer device is provided according to an embodiment of the present application, instructions are stored in the computer device, and when the instructions are executed by a processor, the processor performs any one of the heating deicing control method for the blade.

BRIEF DESCRIPTION OF THE DRAWINGS

The present application can be better understood with the following description of embodiments of the present application in conjunction with the accompanying drawings, wherein the same or similar reference numerals indicate the same or similar features.

| Reference numerals: | |
|---|---|
| 101 first baffle; | 102 second baffle; |
| 103 first air recirculation zone; | 104 first blade leading edge zone; |
| 201 third baffle; | 202 fourth baffle; |
| 203 fifth baffle; | 204 sixth baffle; |
| 205 second air recirculation zone; | 206 blade tip cavity; |
| 207 middle cavity; | 208 blade root cavity; |
| 301 first heater (heat preservation heater); | 302 second heater (intensive heater); |
| 303 first heating pipe (heat preservation pipe); | |
| 304 second heating pipe (intensive heating pipe); | |
| 401 controller; | 402 heating device; |
| 501 shut-off valve; | 502 air outlet branch pipe; |
| 503 air outlet; | 504 temperature sensor; |
| 701 master PLC; | 702 first blower; |
| 703 second blower; | 704 first solid state relay; |
| 705 first alternating current contactor; | 706 second solid state relay; |
| 707 second alternating current contactor. | |

A, B, C, D, E, and F indicating serial numbers of sub-cavities, respectively;

g indicating an air recirculation port corresponding to the sub-cavity A;

i-1, i-2, i-3, i-4 and i-5 respectively indicating the air recirculation ports corresponding to the sub-cavities B to F;

h indicating the air recirculation port corresponding to the root cavity;

S1, S2, S3, S4, S5 and S6 respectively indicating temperature sensors arranged in the sub-cavities A to F;

K1, K2, K3, K4, K5 and K6 respectively indicating the shut-off valves arranged in the second heating pipe (intensive heating pipe) at portions located in the sub-cavities A to F.

DETAILED DESCRIPTION OF EMBODIMENTS

Features of various aspects of the present application and exemplary embodiments of the present application are described in detail below. In the following detailed description, many specific details are set forth to provide a comprehensive understanding for the embodiments of the present application.

A heating deicing system for a blade and a control method thereof, a blade and a wind turbine are provided according to the present application, for heating and deicing the blade of the wind turbine. The heating deicing system and the control method thereof in the embodiments of the present application are applicable for heating and deicing the blade of the hoisted turbine. By adopting the technical solution of the embodiments of the present application, a good deicing effect can be achieved on the premise of improving the heating efficiency for the blade.

The heating deicing system for the blade provided by an embodiment of the present application includes an isolating device, multiple heating devices and a controller. The isolating device is arranged in a blade cavity and divides a part of the blade cavity close to a leading edge of the blade into multiple sub-cavities sequentially distributed along a length direction of the blade.

Figure 1:
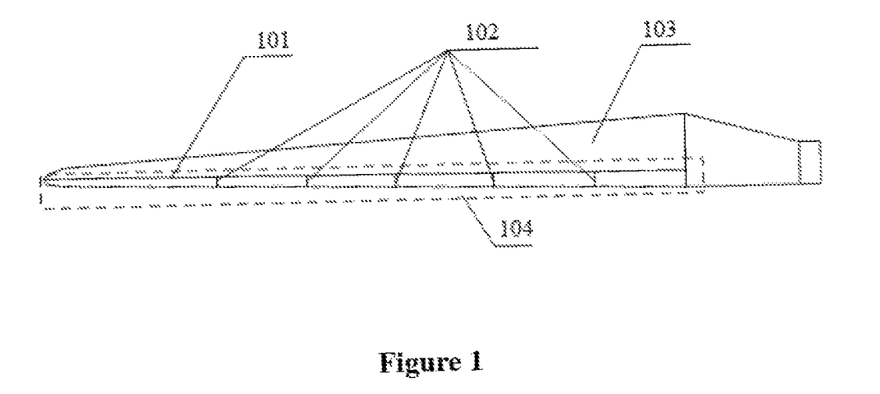
FIG. 1 is a schematic view showing the structure of an isolating device of a heating deicing system for a blade according to an embodiment of the present application.

FIG. 1 is a schematic view showing the structure of an isolating device of the heating deicing system for the blade according to an embodiment of the present application. The isolating device shown in FIG. 1 includes a first baffle 101 and multiple second baffles 102.

The first baffle 101 is arranged along an extending direction of the blade and divides the blade cavity into a first air recirculation zone 103 and a first blade leading edge zone 104. The multiple second baffles 102 are vertically arranged and divide the first blade leading edge zone 104 into multiple sub-cavities arranged along the length direction of the blade.

Figure 2:
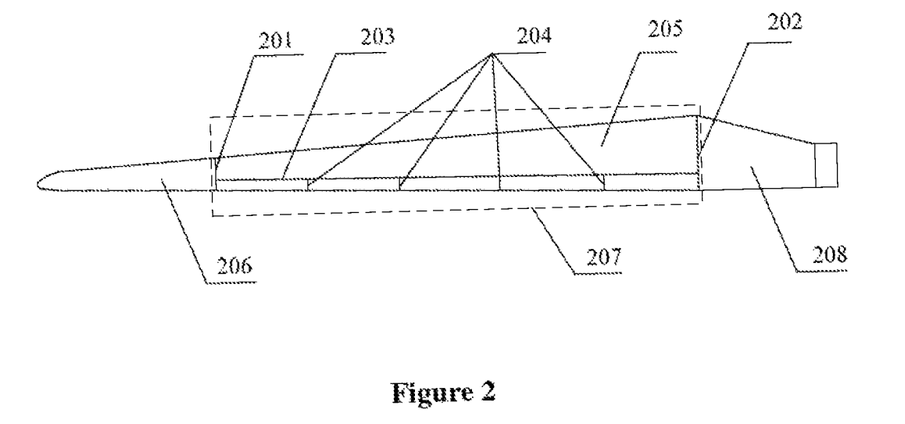
FIG. 2 is a schematic view showing the structure of an isolating device of a heating deicing system for a blade according to another embodiment of the present application.

FIG. 2 is a schematic view showing the structure of an isolating device of the heating deicing system for the blade according to another embodiment of the present application. The isolating device shown in FIG. 2 includes a third baffle 201, a fourth baffle 202, a fifth baffle 203 and multiple sixth baffles 204.

The third baffle 201 and the fourth baffle 202 are vertically arranged and divide the blade cavity into a blade tip cavity 206, a middle cavity 207 and a blade root cavity 208 from the tip to the root of the blade. The fifth baffle 203 is arranged along an extending direction of the blade and divides the middle cavity 207 into a second air recirculation zone 205 and a second blade leading edge zone. The multiple sixth baffles 204 are vertically arranged and divide the second blade leading edge zone into multiple leading edge sub-cavities arranged along the length direction of the blade, and the number of the leading edge sub-cavities shown in FIG. 2 is five.

According to embodiments of the present application, the blade tip cavity 206 and the five leading edge sub-cavities can be arranged as the sub-cavities sequentially arranged along the length direction of the blade after a part of the blade cavity close to a leading edge of the blade is divided.

Figure 3:
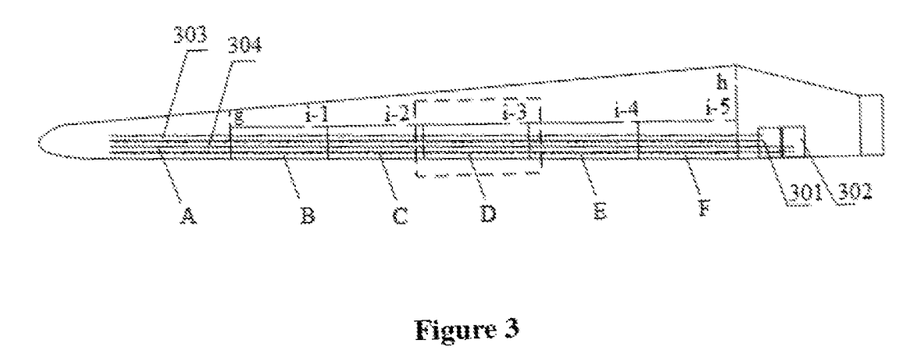
FIG. 3 is a schematic view showing the structure of a heating deicing system for the blade corresponding to the isolating device in FIG. 2.

Referring to FIG. 3, FIG. 3 is a schematic view showing the structure of the heating deicing system for the blade corresponding to the isolating device in FIG. 2. In order to clearly describe the positions of the multiple sub-cavities, the multiple sub-cavities of the embodiment shown in FIG. 3 are numbered respectively, and the serial numbers of the sub-cavities are A, B, C, D, E, and F, respectively. The sub-cavity A corresponds to a tip of the blade, the sub-cavities B to F respectively correspond to the multiple sub-cavities in the leading edge zone of the blade and arranged along the length direction of the blade.

The embodiment shown in FIG. 3 further shows that an air recirculation port g corresponding to the blade tip cavity 206 is arranged in the third baffle 201 at a portion close to the second air recirculation zone 205; an air recirculation port h corresponding to the blade root cavity 208 is arranged in the fourth baffle 202 at a portion close to the second air recirculation zone 205; and air recirculation ports i-1, i-2, i-3, i-4, and i-5 respectively corresponding to the leading edge sub-cavities are arranged in the fifth baffle 203 at portions located in the sub-cavities. Through the above air recirculation ports, hot air may circulate in the blade cavity.

Figure 4:
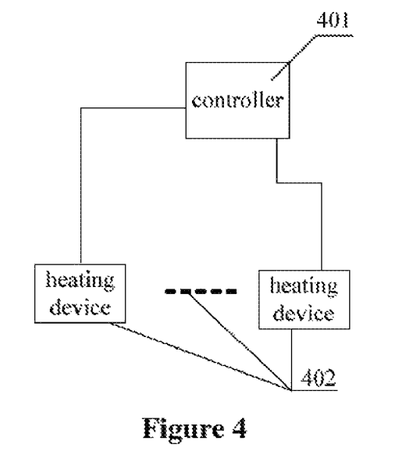
FIG. 4 is a schematic diagram of an electrical structure of a heating deicing system for a blade according to an embodiment of the present application.

FIG. 4 is a schematic diagram of an electrical structure of a heating deicing system for a blade according to an embodiment of the present application. The heating deicing system for the blade shown in FIG. 4 includes heating devices 402 arranged in respective sub-cavities and a controller 401.

Multiple sub-cavities are formed by dividing a part of the blade cavity close to the leading edge of the blade by the isolating device, and are sequentially distributed along the length direction of the blade. Generally, the leading edge of the blade is an area where ice is easy to form. The controller 401 is able to respond to a blade deicing instruction, and respectively controls opening and closing of the heating devices 402 in the sub-cavities to heat the multiple sub-cavities. The number of the heating devices may be one or more. Multiple heating devices cooperate to heat, which facilitates precise control of the temperatures of the sub-cavities.

In the embodiments of the present application, since the part of the blade cavity close to the leading edge of the blade is divided into multiple independent sub-cavities, each of the sub-cavities is provided with the heating device 402, such that each of the sub-cavities can be independently heated. Compared with the conventional art that the blade cavity needs to be integrally heated, independently heating each sub-cavity can avoid the problem of uneven heat distribution caused by the large space of the blade cavity, thereby achieving a good deicing effect under the premise of improving the heating efficiency.

Each heating device includes a heater and a corresponding heating pipe. In order to achieve separate heating of each sub-cavity, the heating device 402 in the sub-cavity of the embodiment of the present application may be achieved in many ways.

In an example, independent heaters and corresponding heating pipes are respectively arranged in the sub-cavities, and separate heating of each sub-cavity can be achieved by separately controlling the heaters in each sub-cavity.

In another example, independent heating pipes may be respectively arranged in the sub-cavities, and one heater is arranged in a part of the blade cavity close to the blade root. The heating pipes in the multiple sub-cavities are connected to the same heater, thus separate heating of each sub-cavity can be achieved by controlling the opening and closing of the heating pipe in each sub-cavity.

In a further example, it is also possible that multiple sub-cavities share one heater and one corresponding heating pipe, to simplify the structure of the heating deicing system and reduce waste of heating resources. Specifically, the heater may be arranged in the part of the blade cavity close to the blade root, the heating pipe may have one end in communication with the heater, and another end sequentially passing through the multiple sub-cavities. Openings are arranged in the heating pipe at portions located in the sub-cavities respectively, and the hot air generated by the heater can be sent into each sub-cavity, thereby realizing separate heating of each sub-cavity.

Taking a case that each sub-cavity contains two heating devices 402 as an example, the two heating devices 402 are respectively a first heating device and a second heating device, and a heating power of the first heating device is smaller than a heating power of the second heating device. A heating device having a lower heating power can be referred to as a heat preservation heating device and the other heating device having a higher heating power can be referred to as an intense heating device.

The heat preservation heating device includes a heat preservation heater 301 (that is, a first heater) and a heat preservation pipe 303 (that is, a first heating pipe), and the heat preservation heater 301 can be started in advance to preheat the multiple sub-cavities, and can also be continuously opened to maintain the temperatures of the multiple sub-cavities.

The intense heating device includes an intensive heater 302 (that is, a second heater) and an intensive heating pipe 304 (that is, a second heating pipe), and the intensive heater 302 can heat each sub-cavity to a higher temperature.

FIG. 3 further shows the arrangement of the heat preservation heater 301 and the intensive heater 302 in the blade. The heat preservation heater 301 is arranged in a blade root cavity 208 of the blade. The heat preservation pipe 303 has one end in communication with the heat preservation heater 301, and another end passing through the multiple sub-cavities A to F in sequence. The intensive heater 302 is also arranged in the blade root cavity 208 of the blade. The intensive heating pipe 304 has one end in communication with the intensive heater 302, and another end sequentially passing through the multiple sub-cavities A to F.

The heat preservation heater 301 and the intensive heater 302 may be arranged adjacent to each other or spaced from each other by a certain distance. The heat preservation pipe 303 and the intensive heating pipe 304 may be arranged at a same height or at different heights, which is not limited by the embodiments of the present application.

Figure 5:
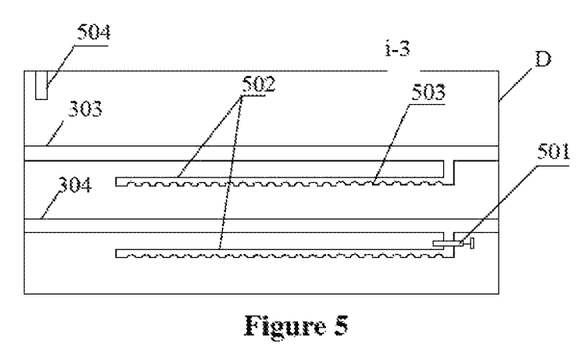
FIG. 5 is an enlarged view of the internal structure of a sub-cavity D in FIG. 3.

FIG. 5 is an enlarged view of the internal structure of the sub-cavity D in FIG. 3. In order to ensure the uniform heating of the space of each sub-cavity, an air outlet branch pipe 502 may be arranged on the heat preservation pipe 303 and the intensive heating pipe 304 at portions located in each sub-cavity, and the air outlet branch pipe 502 may extend in a direction parallel to the corresponding pipe.

The diameter of the air outlet branch pipe 502 is required to be much smaller than the diameter of the heating pipe, to reduce the influence of the air outlet branch pipe 502 on the temperature and pressure of the hot air in the heating pipe.

Multiple air outlets 503 may be arranged in the air outlet branch pipe 502. Since the leading edge of the blade is easy to form ice, the openings of the multiple air outlets 503 may be arranged toward the leading edge of the blade, so that the hot air in the heating pipe can be directly blown to the leading edge of the blade through the air outlets 503, thereby improving the heating efficiency of each sub-cavity.

As shown in FIG. 5, a shut-off valve 501 may be arranged on the intensive heating pipe 304 at a portion located in each sub-cavity. K1 to K6 are shut-off valves arranged on the second heating pipe (that is, the intensive heating pipe) at portions located in the sub-cavities A to F, respectively. The controller 401 can separately control opening and closing of the shut-off valve 501 of the intensive heating pipe 304 in each sub-cavity, to realize separate heating of the multiple sub-cavities. The shut-off valve 501 can be arranged at a junction of the air outlet branch pipe 502 and the intensive heating pipe 304. The controller 401 can separately control opening and closing of the shut-off valve 501 of the heating pipe in each sub-cavity, to realize intense heating of the multiple sub-cavities.

It should be noted that since the heat preservation heater 301 has a low power, mainly functions for preheating and heat preservation, it is not necessary to provide a shut-off valve 501 on the heat preservation heater. However, those skilled in the art may also arrange, according to practical needs, the shut-off valve 501 on the heat preservation pipe 303 at a portion in each sub-cavity, which is not limited by the embodiments of the present application.

In order to achieve precise temperature control of each sub-cavity, the heating deicing system further includes multiple temperature sensors, and the multiple temperature sensors are respectively arranged in the multiple sub-cavities. The controller 401 can separately control opening and closing of the shut-off valve 501 in each sub-cavity according to the temperature of each sub-cavity. Illustratively, the shut-off valve 501 may be a solenoid valve or other valves that can be electrically controlled.

In an example, a temperature sensor is mounted in each sub-cavity at a position away from the intensive heating pipe 304. The temperature sensor S4 (504) in the sub-cavity D in FIG. 5 is mounted in the upper left region of the sub-cavity. The upper left region avoids the intensive heating pipe 304, and also avoids the air recirculation port, thereby making the data sensed by the temperature sensor more objective.

Taking the sub-cavity D as an example, an air supply of the heat preservation pipe 303 is not controlled, and after entering the heating deicing process, the heat preservation pipe 303 continuously provides a constant amount of hot air. While the air supply of the intensive heating pipe 304 is adjusted according to the temperature of the sub-cavity D. If the temperature of the sub-cavity D is lower than a second temperature threshold T2, the shut-off valve 501 is controlled to be open, to intensely heat the sub-cavity D, and if the temperature of the sub-cavity D is higher than a first temperature threshold T1, the shut-off valve K4 (501) in the control sub-cavity D is controlled to be closed, to stop intensely heating the sub-cavity D, to ensure that the temperature of the sub-cavity D is within a range of [T2, T1].

Figure 6:
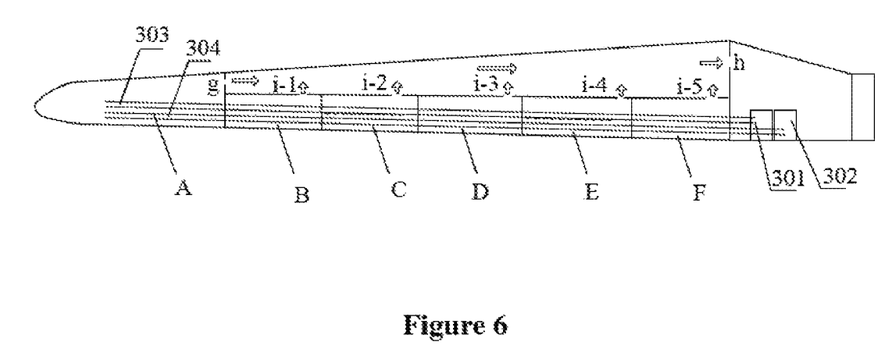
FIG. 6 is a schematic view showing a flow direction of air in a blade cavity corresponding to the heating deicing system for the blade in FIG. 3.

FIG. 6 is a schematic view showing a flow direction of air in a blade cavity corresponding to the heating deicing system for the blade in FIG. 3. As indicated by the arrows, an air flow path in the blade cavity is: starting from the blade root cavity 208, the air heated by the heat preservation heater 301 is sent into each of the sub-cavities through the heat preservation pipe 303, the air heated by the intensive heater 302 is sent to each of the sub-cavities through the intensive heating pipe 304, the relatively cool air in each of the sub-cavities enters the second air recirculation zone 205 through their respective air recirculation ports, and the air in the second air recirculation zone 205 eventually flows back into the blade root cavity 208 through the air recirculation port.

Specifically, the relatively cool air in the sub-cavity A enters the second air recirculation zone 205 through the air recirculation port g, the relatively cool air in the sub-cavities B to F respectively enters the second air recirculation zone 205 through the air recirculation ports i-1, i-2, i-3, i-4 and i-5, and the air in the second air recirculation zone 205 eventually flows back into the blade root cavity 208 through the air recirculation port h.

In addition, each heating device 402 may further include a blower, and the blower is arranged close to the heater. The controller 401 can control startup and shutdown of the blower, to allow the heated air to form hot wind to be sent into the corresponding heating pipe. Moreover, each heating device 402 further includes an alternating current contactor for controlling startup and shutdown of the blower according to a start/stop control signal of the controller 401.

In addition, each heating device 402 further includes a solid state relay. The solid state relay can output a power control signal to the heater according to a frequency control signal of the controller 401, and the heater can output a corresponding heating power according to the power control signal.

Figure 7:
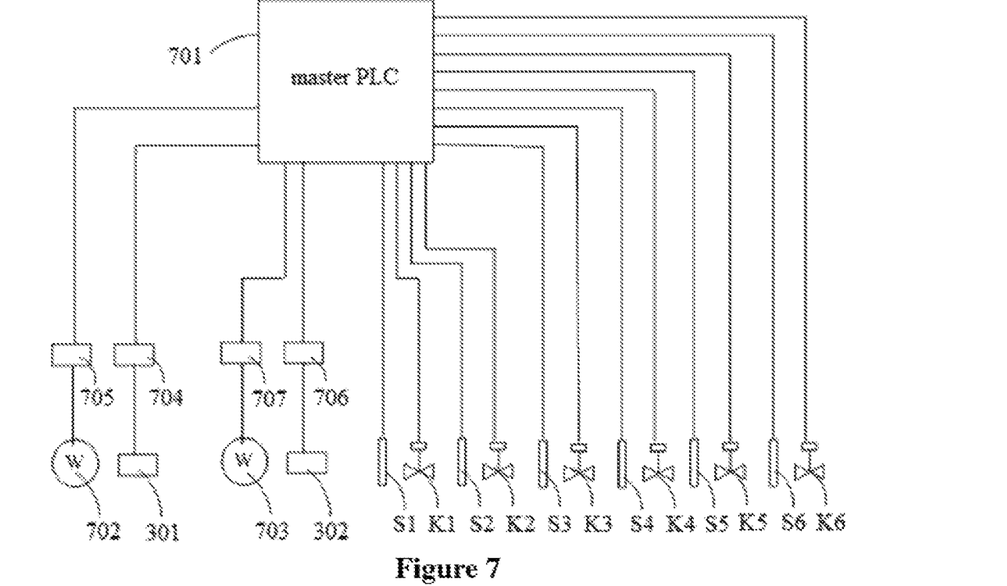
FIG. 7 is a schematic diagram of an electrical structure of the heating deicing system for the blade in FIG. 3.

Referring to FIG. 7, FIG. 7 is a schematic diagram of an electrical structure of the heating deicing system for the blade in FIG. 3. Taking the cost of a wind turbine into consideration, a master programmable logic controller (PLC) 701 of the wind turbine may be used to perform logic operation for the heating control of the blade.

The heat preservation heater 301 has a low power, and is used to provide a heat source for the hot air in the heat preservation pipe 303. A first blower 702 is arranged adjacent to the heat preservation heater 301 for blowing the hot air in the heat preservation pipe 303 into each of the sub-cavities that need to be separately heated. The intensive heater 302 has a high power, and is used to provide a heat source for the hot air in the intensive heating pipe 304. A second blower 703 is arranged adjacent to the intensive heater 302 for blowing the hot air in the intensive heating pipe 304 into each of the sub-cavities that need to be separately heated.

The heat preservation heater 301, the first solid state relay 704 and the master PLC 701 are sequentially connected, and the master PLC 701 can transmit a frequency control signal ranging from 4 mA to 20 mA to control the first solid state relay 704 to output a power control signal with a frequency of 0 Hz to 50 Hz. The heat preservation heater 301 can output a corresponding heating power according to the power control signal of 0 Hz to 50 Hz.

The first blower 702, the first alternating current contactor 705 and the master PLC 701 are sequentially connected, the master PLC 701 can send a start/stop control signal to the first alternating current contactor 705, and the first alternating current contactor 705 starts or stops according to the start/stop control signal, to control the startup and shutdown of the first blower 702.

The intensive heater 302, the second solid state relay 706 and the master PLC 701 are sequentially connected, and the master PLC 701 can transmit a frequency control signal ranging from 4 mA to 20 mA to control the second solid state relay 706 to output a power control signal with a frequency of 0 Hz to 50 Hz. The intensive heater 302 can output a corresponding heating power according to the power control signal of 0 Hz to 50 Hz.

The second blower 703, the second alternating current contactor 707 and the master PLC 701 are sequentially connected, the master PLC 701 can send a start/stop control signal to the second alternating current contactor 707, and the second alternating current contactor 707 starts or stops according to the start/stop control signal, to control the startup and shutdown of the second blower 703.

The temperature sensors S1 to S6 in FIG. 7 correspond to the sub-cavities A to F respectively, and each temperature sensor detects the temperature of the corresponding sub-cavity, and sends the detected temperature to the master PLC 701.

The shut-off valves K1 to K6 in FIG. 7 are corresponding to the shut-off valves 501 of the multiple sub-cavities A to F on the intensive heating pipe 304, and each of the shut-off valves 501 opens or closes according to an opening/closing control signal of the master PLC 701. By controlling the opening and closing of each of the shut-off valves 501, the specific time period during which the intense heated air is fed into each sub-cavity can be controlled, thereby achieving separate heating of each sub-cavity.

Figure 8:
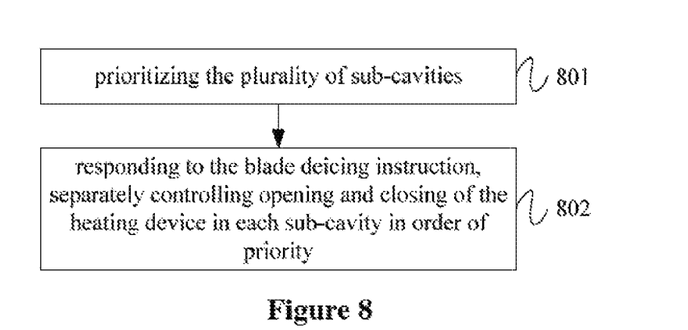
FIG. 8 is a schematic flow chart of a heating deicing control method for a blade according to an embodiment of the present application.

FIG. 8 is a schematic flow chart of a heating deicing control method for a blade, which is applied to the heating deicing systems in FIGS. 1 to 7, according to embodiments of the present application. The heating deicing control method in FIG. 8 includes steps 801 and 802.

In step 801, multiple sub-cavities are prioritized.

In an example, the multiple sub-cavities may be prioritized in order of position from the tip to the root of the blade, that is, the priorities of the sub-cavity A to the sub-cavity F gradually descend. The sub-cavity A is located in the blade tip area, and since the ice formation on the blade tip area is most serious, the sub-cavity A can be the highest priority sub-cavity.

In step 802, in response to the blade deicing instruction, the opening and closing of each of the multiple heating devices 402 in each of the sub-cavities are respectively controlled in order of priority, to heat the multiple sub-cavities.

In order to precisely heat the multiple sub-cavities and reduce the waste of thermal energy, the opening and closing of each of the multiple heating devices 402 in each sub-cavity may be separately controlled in order of priority according to the temperatures of the multiple sub-cavities.

A detailed description of the heating deicing control method provided according to the embodiments of the present application is made as follows, by taking a case that each sub-cavity contains two heating devices 402 as an example.

In order to improve the safety and stability of the heating deicing system, the first heating device in each sub-cavity can be control to be continuously turned on in response to the blade deicing instruction, and the opening and closing of the second heating device in each sub-cavity is separately controlled in order of priority, according to the temperatures of the multiple sub-cavities.

Figure 9:
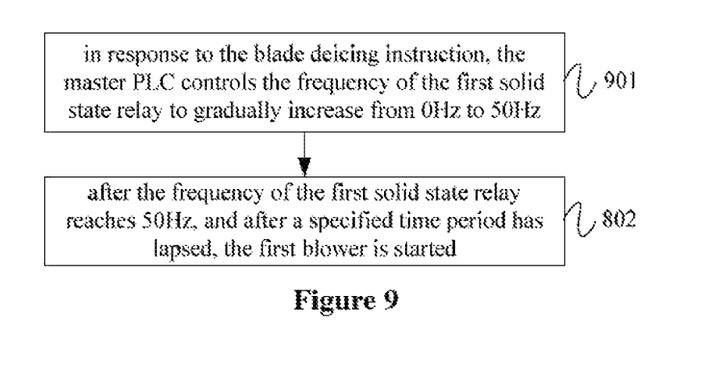
FIG. 9 is a schematic flow chart of a first startup of a heat preservation circuit of the heating deicing system according to an embodiment of the present application.

FIG. 9 is a schematic flow chart of a first startup of a heat preservation circuit of the heating deicing system according to an embodiment of the present application. The startup process of the heat preservation circuit shown in FIG. 9 includes steps 901 and 902.

In step 901, in response to the blade deicing instruction, the frequency of the first solid state relay 704 is controlled to be gradually increased from 0 Hz to 50 Hz to achieve a soft start of the heat preservation heater 301, thereby reducing an impact of the heat preservation heating start on the power supply.

In step 902, when the frequency of the first solid state relay 704 reaches 50 Hz, and after a specified time period has lapsed, the first blower 702 is started to blow the hot air into each sub-cavity through the heating pipe, and the startup of the heat preservation circuit is finished.

Illustratively, the first blower 702 may be started after a delay of 2 seconds to preheat the air in the blade cavity. The delay time period can be set by the master PLC 701.

Since the heating power of the heat preservation heater 301 is small, the heat preservation heater 301 can be set to continuously operate after being started, to maintain the heat preservation circuit in an on-state.

After the heat preservation circuit is started up, each of the sub-cavities can be intensely heated. Since the control process of the intense heating circuit is relatively complicated, the control of the intense heating circuit can be divided into a start control, a deicing first cycle control and an intermediate temperature control following the deicing first cycle.

Figure 10:
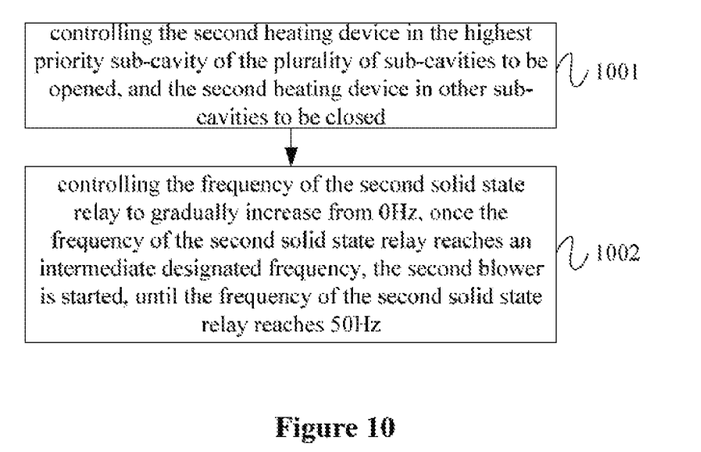
FIG. 10 is a schematic flow chart of a startup of an intense heating circuit of a heating deicing system for a blade according to an embodiment of the present application.

FIG. 10 is a schematic flow chart of a startup of an intense heating circuit of the heating deicing system for a blade according to an embodiment of the present application. The startup process of the intense heating circuit shown in FIG. 10 includes steps 1001 and 1002.

In step 1001, the shut-off valve K1 in the highest priority sub-cavity A of the multiple sub-cavities is controlled to be opened, and the shut-off valves 501 in the other sub-cavities are controlled to be closed, to heat the highest priority sub-cavity A.

In step 1002, the frequency of the second solid state relay 706 is gradually increased from 0 Hz, to achieve a soft start of the intensive heater 302, thereby reducing an impact of a startup of the intensive heater 302 on the power supply. Once the frequency of the second solid state relay 706 reaches an intermediate designated frequency, for example 30 Hz, the second blower 703 is started to prevent the temperature of the air in the sub-cavities from being too high during the startup process, until the frequency of the second solid state relay 706 reaches 50 Hz, and the startup of the intense heating circuit is finished. In an example, the intermediate designated frequency can be set by the master PLC 701.

Figure 11:
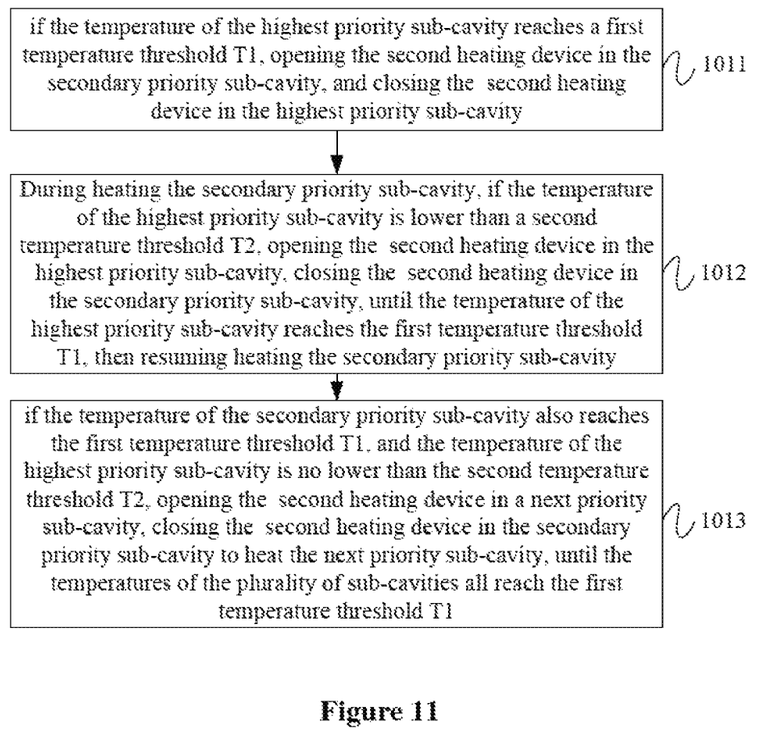
FIG. 11 is a schematic flow chart of a deicing first cycle control of a heating deicing system for a blade according to an embodiment of the present application.

FIG. 11 is a schematic flow chart of a deicing first cycle control of the heating deicing system for a blade according to an embodiment of the present application. The deicing first cycle control process of the intense heating circuit shown in FIG. 11 includes steps 1011 to 1013.

In step 1011, when the temperature of the highest priority sub-cavity A reaches the first temperature threshold T1, the shut-off valve K2 in the secondary priority sub-cavity B is opened, and the shut-off valve K1 in the highest priority sub-cavity A is closed, thereby heating the secondary priority sub-cavity B.

In step 1012, during the process of heating the secondary priority sub-cavity B, if the temperature of the highest priority sub-cavity A is lower than the second temperature threshold T2, the shut-off valve K1 in the highest priority sub-cavity A is opened, the shut-off valve K2 in the secondary priority sub-cavity B is closed, to heat the highest priority sub-cavity A again, until the temperature of the highest priority sub-cavity A reaches the first temperature threshold T1, and then heating of the secondary priority sub-cavity B is resumed.

In step 1013, when the temperature of the secondary priority sub-cavity B also reaches the first temperature threshold T1, and the temperature of the highest priority sub-cavity A is no lower than the second temperature threshold T2, the shut-off valve 501 in a next priority sub-cavity is opened, the shut-off valve K2 in the secondary priority sub-cavity B is closed, thereby heating the next priority sub-cavity, until the temperatures of the multiple sub-cavities all reach the first temperature threshold T1.

It should be noted that, in the process of heating the next priority sub-cavity, such as the third sub-cavity C, if the temperature of any one of the highest priority sub-cavity A and the secondary priority sub-cavity B is lower than the second temperature threshold T2, the highest priority sub-cavity A and the secondary priority sub-cavity B need to be heated again. Similarly, the fourth priority sub-cavity D, the fifth priority sub-cavity E and the sixth priority sub-cavity F are heated in the same manner until the temperatures in all the multiple sub-cavities reach the first temperature threshold, and heating of all the sub-cavities is completed.

In an example, during the process of heating a current sub-cavity, if there is one sub-cavity having a temperature lower than the second temperature threshold T2 and a priority higher than the priority of the current sub-cavity, the shut-off valve 501 in this sub-cavity is opened and the shut-off valve 501 in the current sub-cavity is closed, to heat this sub-cavity until the temperature of this sub-cavity reaches the first temperature threshold T1 again. Then the shut-off valve 501 in this sub-cavity is closed and the shut-off valve 501 in the current sub-cavity is opened, and heating of the current sub-cavity is resumed.

In another example, during the process of heating a current sub-cavity, if there are multiple sub-cavities each having a temperature lower than the second temperature threshold T2 and a priority higher than the priority of the current sub-cavity, then the shut-off valve 501 in the current sub-cavity is closed and these multiple sub-cavities are heated in order of priority, until the temperatures of all these multiple sub-cavities reach the first temperature threshold T1 again, and heating of the current sub-cavity is resumed.

It should also be noted that if a next priority sub-cavity needs to be heated during the process of heating a current sub-cavity or after the heating of the current sub-cavity is completed, the shut-off valve 501 of the next priority sub-cavity needs to be opened first, and the shut-off valve 501 in the current priority sub-cavity is then closed, to ensure that the heating pipe is always opened, thereby avoiding partial overheating of the heating air due to poor circulation caused by the complete closure of the heating pipe.

When all the sub-cavities are heated and the temperature in each sub-cavity is not lower than the second temperature threshold T2, the intermediate temperature control process after the deicing first cycle control can be performed.

Figure 12:
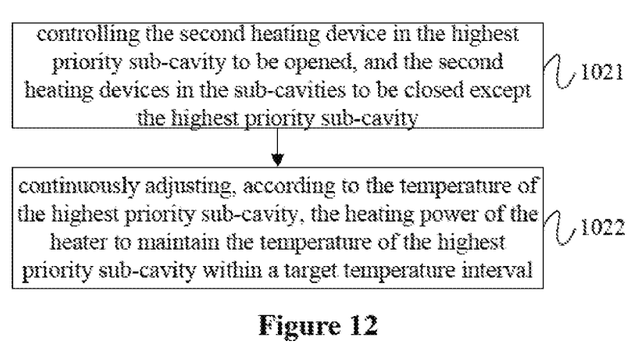
FIG. 12 is a schematic flow chart of an intermediate temperature control of a heating deicing system for a blade according to an embodiment of the present application.

FIG. 12 is a schematic flow chart of an intermediate temperature control of the heating deicing system for a blade according to an embodiment of the present application. The intermediate temperature control process in FIG. 12 includes steps 1021 and 1022.

In step 1021, the shut-off valve 501 in the highest priority sub-cavity A is controlled to be opened, and the shut-off valves 501 in the other sub-cavities in the multiple sub-cavities except the highest priority sub-cavity A are controlled to be closed. It is focused on controlling the highest priority sub-cavity.

In step 1022, the heating power of the intensive heater 302 is continuously adjusted according to the temperature of the highest priority sub-cavity A, and the temperature of the highest priority sub-cavity A is maintained within a target temperature interval.

In order to maintain the temperature of the highest priority sub-cavity A within the target temperature interval, the master PLC 701 may output a frequency control signal with a variable frequency to the second solid state relay 706, the second solid state relay 706 may output different power control signals of different power according to the varying frequencies, and the intensive heater 302 may output corresponding heating power according to the power supply control signals of different power.

Wherein, the highest temperature value in the target temperature interval is lower than the first temperature threshold T1, and the lowest temperature in the target temperature interval is higher than the second temperature threshold T2.

In an embodiment, an optimal temperature T3 and an optimal deviation t are set, and the target temperature interval can be expressed as [T3−t, T3+t], wherein each temperature value satisfies: T2<T3−t<T3+t<T1.

It should be noted that, in a process of maintaining the temperature of the highest priority sub-cavity A, if there is a sub-cavity having a temperature lower than the second temperature threshold T2 in the above mentioned sub-cavities in the multiple sub-cavities except the highest priority sub-cavity A, it is necessary to intensely heat this sub-cavity in time.

If there is one sub-cavity having a temperature lower than the second temperature threshold T2, the shut-off valve 501 in this sub-cavity is opened and the shut-off valve 501 in the highest priority sub-cavity is closed, and this sub-cavity is heated until the temperature of this sub-cavity reaches the first temperature threshold T1 again. Then the shut-off valve 501 in this sub-cavity is closed and the shut-off valve 501 in the highest priority sub-cavity is opened, and maintaining the temperature of the highest priority sub-cavity A is resumed.

If there are multiple sub-cavities each having a temperature lower than the second temperature threshold T2, these multiple sub-cavities are heated in order of priority, until the temperatures of these multiple sub-cavities all reach the first temperature threshold T1 again, and maintaining the temperature of the highest priority sub-cavity A is resumed.

An embodiment of the present application further provides a blade. Referring to FIGS. 1 to 7, the blade is provided with the above-described heating deicing system for the blade.

An embodiment of the present application further provides a computer device, and instructions of any one of the heating deicing control methods for the blade are stored in the computer device, and when the instructions are executed by a processor, the processor performs the heating deicing control method.

An embodiment of the present application further provides a wind turbine. The wind turbine includes the blades as described above.

As described above, embodiments of the present application isolate the internal space of the blade, which can only heat air in the target area, thereby improving the conversion efficiency from electrical energy to heat energy. Besides, the embodiments of the present application apply a separate temperature control system for each independent space, so that the temperature of a local area in the blade can be controlled, thereby effectively avoiding local damage of the blade and achieving effective deicing.

It should be understood that the above embodiments are described in a progressive manner, references may be made among these embodiments with respect to the same or similar portions among these embodiments, and each of the embodiments is mainly focused on describing its differences from other embodiments. For embodiments of apparatus, the related parts can be referred to the description in the embodiments of method. Embodiments of the present application are not limited to the specific steps or structures described above and illustrated in the figures. Those skilled in the art can make various changes, modifications and additions, or change the order of the steps with understanding the spirit of the embodiments of the present application. In addition, for the sake of briefness, detailed descriptions of known methods and techniques are omitted here.

The functional blocks shown in the structural block diagrams described above may be implemented as hardware, software, firmware, or a combination thereof. In the case that the function blocks are implemented as hardware, the hardware may be, for example, an electrical circuit, an application specific integrated circuit (ASIC), an appropriate firmware, a plug-in component or a functional card. In the case that the function blocks are implemented as software, elements of the embodiments of the present application are programs or code segments for performing required tasks. The programs or code segments may be stored in a machine-readable medium or may be transferred over a transmission medium or communication link via a data signal carried in a carrier. The "machine-readable medium" may include any medium which can store or transmit information. Examples of the machine-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, and etc. The code segments may be downloaded via computer networks such as the Internet, Intranet, and etc.

Those skilled in the art should understand that the above-described embodiments are illustrative rather than limiting. Different technical features that appear in different embodiments may be combined to achieve beneficial effects. Other variations to the disclosed embodiments may be understood and implemented by the person skilled in the art upon studying the drawings, the specification, and the claims. In the claims, the term "comprising" does not exclude other devices or steps, the indefinite article "a" does not exclude multiple, and the terms "first" and "second" are used to indicate the name rather than any particular order. Any reference numerals in the claims should not be construed as limitation to the scope of protection. The functions of various parts appearing in the claims may be implemented by a single hardware or a single software module. The fact that certain technical features appear in different dependent claims does not mean that these technical features cannot be combined to achieve beneficial effects.

The invention claimed is:

1. A heating deicing system for a blade, comprising:
   an isolating device arranged in a blade cavity and dividing a part of the blade cavity close to a leading edge of the blade into a plurality of sub-cavities sequentially distributed along a length direction of the blade;
   a heating device set arranged in the plurality of sub-cavities; and
   a controller configured to separately control opening and closing of the heating device set in the plurality of sub-cavities to heat the plurality of sub-cavities, respectively, in response to a blade deicing instruction, wherein the heating device set comprises at least a first heating device and a second heating device for each sub-cavity, and the controller is further configured to separately control opening and closing of the first and second heating devices in the sub-cavity.

2. The heating deicing system according to claim 1, further comprising a plurality of temperature sensors respectively arranged in the plurality of sub-cavities, wherein the controller is further configured to separately control opening and closing of the first and second heating devices in the sub-cavity according to a temperature sensed by a temperature sensor arranged in the sub-cavity.

3. The heating deicing system according to claim 2, wherein a heating power of the first heating device is smaller than a heating power of the second heating device; and
the controller is further configured to control the first heating device in the sub-cavity to stay open and control opening and closing of the second heating device in the sub-cavity according to the temperature of each of the sub-cavity.

4. The heating deicing system according to claim 1, wherein;
the heating device set comprises a first heater, a second heater, a first heating pipe, and a second heating pipe;
the first and second heaters are arranged in a part of the blade cavity close to a blade root;
the first heating pipe has one end in communication with the first heater and passes through the plurality of sub-cavities;
the second heating pipe has one end in communication with the second heater and passes through the plurality of sub-cavities;
for each sub-cavity, the first heating device comprises a part of the first heating pipe located in the sub-cavity, and the second heating device comprises a part of the second heating pipe located in the sub-cavity; and
the controller is further configured to control opening and closing of the first and second heaters and separately control opening and closing of the part of the first heating pipe and the part of the second heating pipe located in the sub-cavity in response to the blade deicing instruction.

5. The heating deicing system according to claim 4, wherein:
a first air outlet branch pipe is arranged on the part of the first heating pipe located in the sub-cavity, and a diameter of the first air outlet branch pipe is smaller than a diameter of the first heating pipe; and
a second air outlet branch pipe is arranged on the part of the second heating pipe located in the sub-cavity, and a diameter of the second air outlet branch pipe is smaller than a diameter of the second heating pipe.

6. The heating deicing system according to claim 5, wherein each of the first and second air outlet branch pipes extends in a direction parallel to the heating pipe, and each of the first and second air outlet branch pipes is provided with a plurality of air outlets.

7. The heating deicing system according to claim 6, wherein openings of the plurality of air outlets face toward the leading edge of the blade.

8. The heating deicing system according to claim 1, wherein the isolating device comprises:
a first baffle arranged along an extending direction of the blade and dividing the blade cavity into a first air recirculation zone and a first blade leading edge zone; and
a plurality of second baffles arranged along a direction perpendicular to the extending direction of the blade and dividing the first blade leading edge zone into the plurality of sub-cavities arranged along the length direction of the blade.

9. The heating deicing system according to claim 1, wherein the isolating device comprises:
a third baffle and a fourth baffle arranged along a direction perpendicular to an extending direction of the blade and dividing the blade cavity into a blade tip cavity, a middle cavity and a blade root cavity from a tip to a root of the blade;
a fifth baffle arranged along the extending direction of the blade and dividing the middle cavity into a second air recirculation zone and a second blade leading edge zone; and
a plurality of sixth baffles arranged along the direction perpendicular to the extending direction of the blade and dividing the second blade leading edge zone into a plurality of leading edge sub-cavities arranged along the length direction of the blade.

10. The heating deicing system according to claim 9; wherein
an air recirculation port corresponding to the blade tip cavity is arranged in a part of the third baffle close to the second air recirculation zone;
an air recirculation port corresponding to the blade root cavity is arranged in a part of the fourth baffle close to the second air recirculation zone; and
air recirculation ports respectively corresponding to the leading edge sub-cavities are arranged in parts of the fifth baffle located in the leading edge sub-cavities.

11. A blade, comprising:
a blade cavity;
an isolating device arranged in the blade cavity and dividing a part of the blade cavity close to a leading edge of the blade into a plurality of sub-cavities sequentially distributed along a length direction of the blade; and
a heating device set arranged in the plurality of sub-cavities, comprising at least a first heating device and a second heating device for each sub-cavity,
wherein opening and closing of the heating device set in the plurality of sub-cavities are controlled separately by a controller to heat the plurality of sub-cavities, respectively, in response to a blade deicing instruction, and
wherein the controller is further configured to separately control opening and closing of the first and second heating devices in the sub-cavity.

12. A wind turbine comprising:
a blade, comprising:
a blade cavity;
an isolating device arranged in the blade cavity and dividing a part of the blade cavity close to a leading edge of the blade into a plurality of sub-cavities sequentially distributed along a length direction of the blade; and
a heating device set arranged in the plurality of sub-cavities; and
a master programmable logic controller (PLC) configured to separately control opening and closing of the heating device set in the plurality of sub-cavities to heat the plurality of sub-cavities, respectively, in response to a blade deicing instruction,
wherein the heating device set comprises at least a first heating device and a second heating device for each sub-cavity, and the master PLC is further configured to separately control opening and closing of the first and second heating devices in the sub-cavity.

13. The blade according to claim 11, further comprising a plurality of temperature sensors respectively arranged in the plurality of sub-cavities, wherein the controller is further configured to separately control opening and closing of the first and second heating devices in the sub-cavity according to a temperature sensed by a temperature sensor arranged in the sub-cavity.

14. The blade according to claim 13, wherein a heating power of the first heating device is smaller than a heating power of the second heating device; and
the controller is further configured to control the first heating device in the sub-cavity to stay open and control opening and closing of the second heating device in the sub-cavity according to the temperature of the sub-cavity.

15. The blade according to claim 11, wherein:
the heating device set comprises a first heater, a second heater, a first heating pipe, and a second heating pipe;
the first and second heaters are arranged in a part of the blade cavity close to a blade root;
the first heating pipe has one end in communication with the first heater and passes through the plurality of sub-cavities;
the second heating pipe has one end in communication with the second heater and passes through the plurality of sub-cavities;
for each sub-cavity, the first heating device comprises a part of the first heating pipe located in the sub-cavity, and the second heating device comprises a part of the second heating pipe located in the sub-cavity; and
the controller is further configured to control opening and closing of the first and second heaters and separately control opening and closing of the part of the first heating pipe and the part of the second heating pipe located in the sub-cavity in response to the blade deicing instruction.

16. The blade according to claim 15, wherein:
a first air outlet branch pipe is arranged on the part of the first heating pipe located in the sub-cavity, and a diameter of the first air outlet branch pipe is smaller than a diameter of the first heating pipe; and
a second air outlet branch pipe is arranged on the part of the second heating pipe located in the sub-cavity, and a diameter of the second air outlet branch pipe is smaller than a diameter of the second heating pipe.

17. The blade according to claim 16, wherein each of the first and second air outlet branch pipes extends in a direction parallel to the heating pipe, and each of the first and second air outlet branch pipes is provided with a plurality of air outlets.

18. The blade according to claim 17, wherein openings of the plurality of air outlets face toward the leading edge of the blade.

19. The blade according to claim 11, wherein the isolating device comprises:
a first baffle arranged along an extending direction of the blade and dividing the blade cavity into a first air recirculation zone and a first blade leading edge zone; and
a plurality of second baffles arranged along a direction perpendicular to the extending direction of the blade and dividing the first blade leading edge zone into the plurality of sub-cavities arranged along the length direction of the blade.

20. The blade according to claim 11, wherein the isolating device comprises:
a third baffle and a fourth baffle arranged along a direction perpendicular to an extending direction of the blade and dividing the blade cavity into a blade tip cavity, a middle cavity and a blade root cavity from a tip to a root of the blade;
a fifth baffle arranged along the extending direction of the blade and dividing the middle cavity into a second air recirculation zone and a second blade leading edge zone; and
a plurality of sixth baffles arranged along the direction perpendicular to the extending direction of the blade and dividing the second blade leading edge zone into a plurality of leading edge sub-cavities arranged along the length direction of the blade.

* * * * *